3,396,127
PHOTOGRAPHIC HARDENERS
Donald M. Burness and Burton D. Wilson, Rochester,
N.Y., assignors to Eastman Kodak Company, Rochester, N.Y., a corporation of New Jersey
No Drawing. Filed May 22, 1964, Ser. No. 369,629
12 Claims. (Cl. 260—8)

This invention relates to certain compounds found useful as photographic hardeners and to gelatin compositions containing those hardeners.

Some compounds which have been suggested as hardeners for photographic emulsions or other gelatin solutions have been insufficiently effective for that purpose.

One object of our invention is to provide hardeners for photographic gelatin. Another object of our invention is to provide gelatin compositions useful photographically. A further object of our invention is to provide certain compounds which are useful in the preparation of photographic products. Other objects of our invention will appear herein.

We have found that certain quaternary nitrogen type compounds, which compounds are free of deleterious photographic effects, are useful for hardening photographic emulsions or gelatin compositions generally. We have found that bis(alpha-carbonyloxyalkyl quaternary nitrogen) salts and polymeric analogs thereof are useful for hardening purposes in photographic compositions. These hardeners are not only useful in gelatin compositions but also have been found to be effective for hardening polymers containing hydroxyl groups generally when incorporated in compositions thereof prior to coating out onto a support. We have found that several of the compounds in accordance with our invention, in addition to having a hardening effect on gelatin-silver halide photographic emulsion, also exert a sensitizing effect thereon.

The compounds of our invention are conveniently prepared by the alkylation of the appropriate tertiary amine with an appropriate bis(alpha-chloroalkyl carboxylate). In lieu thereof these compounds may be prepared by the direct condensation of acid halide, aldehyde and tertiary amine by the procedure described by Iakubovich et al., J. Gen. Chem. U.S.S.R. Engl. Transl. 28, 1971 (1958). Compounds which have been found to be useful for hardening gelatin or some other polymeric material having carboxyl groups therein have the following general structural formula:

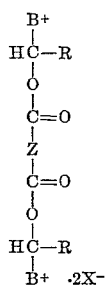

in which X is an acid anion such as halide, perchlorate or other suitable acid anion; R is hydrogen or a lower alkyl radical such as of 1–4 carbon atoms and B+ is a quaternary nitrogen residue from one of the following bases: (1) pyridine or simple derivatives thereof as for example picolines, 2-benzylpyridine, 2-(4-pyridyl)ethanol and the like, (2) a compound with a tertiary nitrogen in a bridgehead position as for example quinuclidene, (3) an aliphatic or cyclic tertiary base as for example trimethylamine, triethylamine, N-methylpiperidine and the like. Z represents a linking structure which may be either a valence bond, a saturated or unsaturated carbon chain or a heterogeneous chain composed predominantly of carbon. It may be a cyclocarbon such as cyclohexylene or phenylene, a chain including phenylene, cyclohexylene, or some other radical or a chain having simple alkyl substituents thereon such as methyl, ethyl, propyl, butyl and the like. The linking structure is most conveniently $(CH_2)_n$ where $n$ equals 1–10.

Where a bifunctional amine is used in preparing the hardener, for example, N,N'-dimethylpiperazine, or where the nitrogen residue is derived from 1,4-diazabicyclo-[2.2.2]octane, polymeric salts will be formed having good hardening activity. The following recurring structure represents polymers of this nature which are useful as hardeners in accordance with our invention:

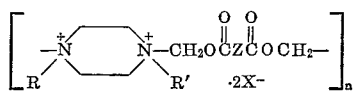

In this structure Z and X represents substituents as listed above and $n$ represents the degree of polymerization, being a number from 2 to 20 or even more. R and R' are hydrogen or lower alkyl or together they may form the hydrocarbon portion of a ring.

In using the hardeners in accordance with our invention they may be employed in gelatin compositions either where gelatin is the main substituent or in compositions in which gelatin is a carrier for suspended material such as in gelatin-silver halide photographic emulsions, gelatin-barium sulfate compositions or other cases where some pigment or insoluble material is in suspension in the gelatin. Useful compositions are also prepared by incorporating these hardeners into solutions or emulsions of polymers containing carboxyl groups as for example acrylic acid copolymers. These hardeners are conveniently used in proportions of 0.5–5%, based on the weight of the gelatin or other polymer to be hardener. However, it is to be understood that the invention is not limited to these proportions as effective amounts outside of this range may occasionally be employed.

The following examples illustrate the preparation of hardeners useful in accordance with our invention.

Example 1.—Adipoylbis(N-oxymethylpyridinium perchlorate)

4.86 grams of bis(chloromethyl)adipate was dissolved in 25 ml. of dry pyridine and the solution was heated on a steam bath for 2 hours. The precipitate was isolated and converted to the perchlorate by a double decomposition reaction with sodium perchlorate. Recrystallization from water gave colorless crystals, M.P. 206–207° (corr.).

Example 2.—Adipoylbis(N-oxymethyl-4-picolinium perchlorate)

This compound was prepared in the same manner as described in Example 1 except that γ-picoline was substituted for the pyridine. The melting point of the crystals obtained was 123–125° (corr.).

Example 3.—Adipoylbis(N-alpha-oxyethylpyridinium perchlorate)

The method described in Example 1 was followed except that an equivalent amount of bis(alpha-chloroethyl)adipate was substituted for the bis(chloromethyl)adipate. The material obtained had no definite melting point and tended to oil out on recrystallization.

Example 4.—Sebacoylbis (oxymethylpyridinium perchlorate)

This material was prepared by the procedure of Example 1 but using an equivalent amount of bis(chloromethyl)sebacate therein. The material obtained had a melting point of 168–171° (corr.).

Example 5.—Adipoylbis(1-oxymethyl-4-aza-1-azoniabicyclo-[2.2.2]octane chloride)

A solution was prepared of 4.86 grams of bis(chlormethyl) adipate and 11.2 grams of 1,4-diazabicyclo[2.2.2] octane in 25 ml. of acetonitrile. This solution was stirred at 25° C. Dense precipitation and an exothermic reaction set in after 3–5 minutes. The precipitate was collected the next day and recrystallized from alcohol-acetone. The product obtained had a melting point of 125–126.5° (corr.).

Example 6.—Poly(1.4-diazoniabicyclo[2.2.2]octane-1,4-dimethyl adipate dichloride)

A solution of equimolar quantities of the reagents of Example 5 in acetonitrile was heated on the steam bath for one hour. The material was purified by repeated dissolution in water and precipitation into acetone.

The salts obtained in the above examples had the following structural formula:

$$^+B-\overset{R}{\overset{|}{C}}HOCO(CH_2)_nCOO\overset{R}{\overset{|}{C}}H-B^+ \cdot 2X^-$$

The various substituents in the examples being as follows:

TABLE I—BIS(ALPHA-CARBONYLOXYALKYL QUATERNARY AMMONIUM) SALTS

| Example | n | R | B+ | X- |
|---|---|---|---|---|
| 1 | 4 | H | 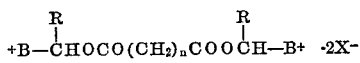 pyridinium | ClO₄⁻ |
| 2 | 4 | H | CH₃-pyridinium (4-methyl) | ClO₄⁻ |
| 3 | 4 | CH₃ | pyridinium | ClO₄⁻ |
| 4 | 8 | H | pyridinium | ClO₄⁻ |
| 5 | 4 | H | 1,4-diazoniabicyclo[2.2.2]octane | Cl⁻ |
| 6¹ | 4 | H | bis-1,4-diazoniabicyclo[2.2.2]octane | 2Cl⁻ |

¹ Polymer.

Samples of the compounds prepared by the above examples were added to separate portions of a high speed-silver bromoiodide emulsion which had been panchromatically sensitized with a cyanine dye. Each emulsion sample was coated on a cellulose acetate film support at a coverage of 432 mg. of silver and 980 mg. of gelatin per square foot. A sample of each film coating was exposed on an Eastman 1B sensitometer, processed for five minutes in Kodak DK-50 developer, fixed, washed and dried with the following results:

TABLE II

| Hardener of Example | Conc., g./100 g. of Gel | Rel. Speed | Gamma | Fog | Percent Vertical Swell in Water |
|---|---|---|---|---|---|
| 1 | Control | 100 | 1.24 | 0.10 | 609 |
|   | 1 | 89 | 1.18 | .09 | 349 |
|   | 5 | 87 | 1.15 | .09 | 214–281 |
|   | 10 | 87 | 1.07 | .08 | 102–256 |
| 2 | Control | 100 | 1.13 | .12 | 850 |
|   | 1 | 118 | 1.17 | .14 | 570 |
|   | 3 | 107 | 1.10 | .13 | 360 |
| 3 | Control | 100 | 1.30 | .16 | 750 |
|   | 1 | 97 | 1.33 | .15 | 700 |
|   | 3 | 102 | 1.27 | .15 | 530 |
|   | 6 | 102 | 1.13 | .17 | 490 |
| 4 | Control | 100 | 1.27 | .17 | 990 |
|   | 3 | 80 | 1.05 | .20 | 370 |
|   | 6 | 53 | .93 | .29 | 230 |
| 5 | Control | 100 | 1.23 | .13 | 860 |
|   | 1 | 107 | 1.30 | .14 | 640 |
|   | 3 | 89 | 1.15 | .13 | 260 |
| 6 | Control | 100 | 1.37 | .13 | 731 |
|   | 3 | 91 | 1.13 | .11 | 278 |
|   | 6 | 74 | 1.07 | .11 | 190 |
|   | 10 | 71 | .97 | .10 | 148 |

Example 7.—Adipoylbis(oxymethyltrimethylammonium perchlorate)

A solution was prepared by dissolving 7.29 grams of bis(chloromethyl)adipate and 45 grams of trimethylamine in 25 ml. of acetonitrile. The solution was stirred for 8 hous under reflux (using a Dry Ice condenser) following which it was allowed to stand over night at room temperature. The thick slurry which resulted was diluted with ether and the solids were collected. The chloride obtained was dried and then converted to the perchlorate by a double decomposition reaction with sodium perchlorate. The product obtained was recrystallized from water, giving colorless crystals of the above mentioned compounds, M.P. 235–236° C.

Example 8.—Adipoylbis(oxymethyltriethylammonium perchlorate)

A solution was prepared of 30 ml. of triethylamine (dried over calcium hydride) and 4.86 grams of bis-chloromethyl)adipate in 25 ml. of acetonitrile. The solution was stirred for 2 days under anhydrous conditions. The solids which precipitated (triethylamine hydrochloride) were filtered off and discarded. The filtrate was concentrated to remove volatiles and the residual oil obtained was converted to the perchlorate by a double decomposition reaction. Evaporation gave a saturated aqueous solution of the perchlorate which yielded seed crystals by means of which the whole could be recrystallized from methanol with seeding. Colorless crystals of the above mentioned compound were obtained, M.P. 139–141° C.

Samples of the compounds prepared in Examples 7 and 8 were added to separate portions of a high-speed silver bromo-iodide emulsion which had been panchromatically sensitized with a cyanine dye. Each emulsion sample was coated on cellulose acetate film support at a coverage of 459 mg. of silver and 1040 mg. of gelatin per square foot. A sample of each film coating and control samples were exposed on an Eastman 1B sensitometer, processed for 5 minutes in Kodak DK–50 developer, fixed, washed, and dried with the following results:

| Hardener of Example | Conc., g./100 g. of Gel | Rel. Speed | Gamma | Fog | Percent Vertical Swell in Water |
|---|---|---|---|---|---|
| 7 | Control | 100 | 1.10 | .11 | 810 |
|   | 1 | 100 | 1.13 | .10 | 410 |
|   | 3 | 102 | 1.13 | .08 | 260 |
| 8 | Control | 100 | 1.25 | .12 | 810 |
|   | 1 | 106 | 1.28 | .12 | 460 |
|   | 6 | 112 | .90 | .28 | 190 |

Examples 9, 10 and 11

Hardening amounts of hardeners in accordance with the invention were added to gelatin containing coating composition as indicated below. Each of the compositions was coated on cellulose acetate film support at the rate of 750 mg. (dry weight) of composition per square food and dried as was also a sample of composition without hardener. The swell in water of each coating was determined with the following results:

| Example | Hardener of Example | Percent hardener in gelatin | Percent hardener in composition [1] | Percent swell in water |
|---|---|---|---|---|
| | Control | | | 500 |
| 9 | 7 | 20 | 5 | 150 |
| 10 | 1 | 20 | 5 | 150 |
| 11 | 5 | 20 | 5 | 120 |

[1] Layer consisted of the designated percent of hardener in a composition of 25% gelatin and 75% ethyl acrylate-acrylic acid copolymer (sodium salt).

The invention has been described in considerable detail with particular reference to certain preferred embodiments thereof, but it will be understood that variations and modifications can be effected within the spirit and scope of the invention as described hereinabove, and as defined in the appended claims.

We claim:

1. A composition of matter comprising gelatin and a hardener therefor having the formula:

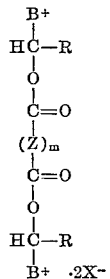

in which X is an acid anion, each R is a substituent selected from the group consisting of hydrogen and the lower alkyl radicals and B+ is a quaternary nitrogen residue selected from the following bases, pyridine, a (low carbon alkyl)pyridine, a benzylpyridine and a (low carbon hydroxyalkyl)pyridine, the compounds with tertiary nitrogen in the bridgehead position and the aliphatic and cyclic tertiary nitrogen bases, Z is a linking structure containing 1–10 carbon atoms selected from the group consisting of the saturated and unsaturated carbon chains and the heterogeneous chains composed predominantly of carbon and $m$ is 0 or 1.

2. A composition of matter comprising a vehicle consisting essentially of gelatin and a hardener therefor having the formula:

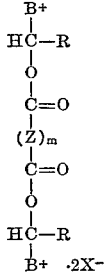

in which X is an acid anion, each R is a substituent selected from the group consisting of hydrogen and the lower alkyl radicals and B+ is a quaternary nitrogen residue selected from the following bases, pyridine, a (low carbon alkyl)pyridine, a benzylpyridine and a (low carbon hydroxyalkyl)pyridine, the compounds with tertiary nitrogen in the bridgehead position and the aliphatic and cyclic tertiary nitrogen bases, Z is a linking structure containing 1–10 carbon atoms selected from the group consisting of the saturated and unsaturated carbon chains and the heterogeneous chains composed predominantly of carbon and $m$ is 0 or 1.

3. A composition of matter comprising gelatin and a hardener therefor having the formula:

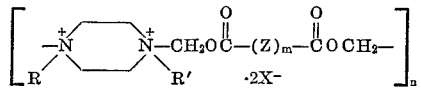

in which R and R' are selected from the group consisting of hydrogen or lower alkyl or together they may form the hydrocarbon portion of a ring, $n$ is an integer from 2–20, Z is a linking structure containing 1–10 carbon atoms selected from the group consisting of saturated and unsaturated carbon chains and the heterogeneous chains composed predominantly of carbon, X is an acid anion and $m$ is 0 or 1.

4. A composition of matter comprising gelatin and a hardener therefor having the formula:

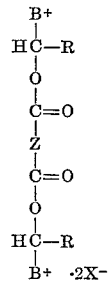

in which X is an acid anion, each R is a substituent selected from the group consisting of hydrogen and the lower alkyl radicals and B+ is a quaternary nitrogen residue selected from the following bases, pyridine, a (low carbon alkyl)pyridine, a benzylpyridine and a (low carbon hydroxyalkyl)pyridine, the compounds with tertiary nitrogen in the bridgehead position and the aliphatic and cyclic tertiary nitrogen bases and Z is $(CH_2)_n$, wherein $n$ is 1–10.

5. A composition of matter comprising gelatin and as a hardener therefor adipoylbis(N-oxymethylpyridinium perchlorate).

6. A composition of matter comprising gelatin and as a hardener therefor adipoylbis(N-oxymethyl-4-picolinium perchlorate).

7. A composition of matter comprising gelatin and as a hardener therefor adipoylbis(N-alpha-oxyethylpyridinium perchlorate).

8. A composition of matter comprising gelatin and as a hardener therefor sebacoylbis(oxymethylpyridinium perchlorate).

9. A composition of matter comprising gelatin and as a hardener therefor adipoylbis(1 - oxymethyl - 4 - aza - 1-azoniabicyclo[2.2.2]octane chloride).

10. A composition of matter comprising gelatin and as a hardener therefor poly(1,4 - diazoniabicyclo[2.2.2]octane-1,4-dimethyl adipate dichloride).

11. A composition of matter comprising gelatin and as a hardener therefor adipoylbis(oxymethyltrimethyl)ammonium perchlorate).

12. A composition of matter comprising a mixture of gelatin and an alkyl acrylate-acrylic acid copolymer containing a hardener having the formula:

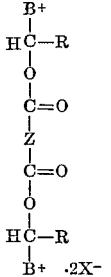

in which X is an acid anion, each R is a substutuent selected from the group consisting of hydrogen and the lower alkyl radicals and B+ is a quaternary nitrogen residue selected from the following bases, pyridine, a (low carbon alkyl)pyridine, a benzylpyridine and a (low carbon hydroxyalkyl)pyridine, the compounds with tertiary nitrogen in the bridgehead position and the aliphatic and cyclic tertiary nitrogen bases and Z is a linking structure selected from the group consisting of a valence bond, the saturated and unsaturated carbon chains and the heterogeneous chains composed predominantly of carbon and $m$ is 0 or 1.

References Cited

UNITED STATES PATENTS 2,858,329   10/1958   Braaten et al. _____ 260—485
3,169,870   2/1965   Knox et al. _____ 106—125

JAMES A. SEIDLECK, *Primary Examiner.*

T. MORRIS, *Assistant Examiner.*